(12) United States Patent
Crawley

(10) Patent No.: US 7,475,899 B2
(45) Date of Patent: Jan. 13, 2009

(54) TRAILER HITCH

(75) Inventor: Steven H. Crawley, Eau Claire, WI (US)

(73) Assignee: Curt Manufacturing, Inc., Eau Claire, WI (US)

( * ) Notice: Subject to any disclaimer, the term of this patent is extended or adjusted under 35 U.S.C. 154(b) by 364 days.

(21) Appl. No.: 11/395,340

(22) Filed: Mar. 31, 2006

(65) Prior Publication Data

US 2007/0235980 A1    Oct. 11, 2007

(51) Int. Cl.
B62D 53/06    (2006.01)

(52) U.S. Cl. .................................... 280/435; 280/434

(58) Field of Classification Search .............. 280/434, 280/435

See application file for complete search history.

(56) References Cited

U.S. PATENT DOCUMENTS

| | | | |
|---|---|---|---|
| 974,877 A | 11/1910 | Greene | |
| 2,102,821 A * | 12/1937 | Seyferth | 280/434 |
| 2,212,708 A | 8/1940 | Fraser | |
| 2,215,903 A | 9/1940 | Edwards | |
| 2,541,209 A | 2/1951 | Cox | |
| 2,618,486 A | 11/1952 | Durant | |
| 2,788,989 A | 4/1957 | Davies | |
| 2,794,656 A | 6/1957 | Seyferth | |
| 2,910,306 A | 10/1959 | Georgi | |
| 3,122,382 A | 2/1964 | Carrier | |
| 3,392,992 A | 7/1968 | Baker et al. | |
| 3,528,683 A * | 9/1970 | Janeway | 280/438.1 |
| 3,729,214 A * | 4/1973 | Mulcahy et al. | 280/407 |
| 3,869,147 A * | 3/1975 | Fry | 280/438.1 |
| 3,963,259 A | 6/1976 | Massey | |
| 4,227,713 A * | 10/1980 | Blodgett et al. | 280/434 |
| 4,721,323 A * | 1/1988 | Czuk et al. | 280/433 |
| 5,044,651 A * | 9/1991 | Weikel | 280/407 |
| 5,060,964 A * | 10/1991 | Vick | 280/421 |
| 5,356,167 A * | 10/1994 | Hall et al. | 280/492 |
| 5,449,191 A * | 9/1995 | Cattau | 280/438.1 |
| 5,509,682 A * | 4/1996 | Lindenman et al. | 280/440 |
| 5,516,138 A * | 5/1996 | Fontaine | 280/434 |
| 5,529,329 A * | 6/1996 | McCoy | 280/438.1 |
| 5,772,229 A * | 6/1998 | Cattau | 280/438.1 |
| 5,839,745 A * | 11/1998 | Cattau et al. | 280/434 |

(Continued)

FOREIGN PATENT DOCUMENTS

EP    0 114 046 A2    1/1984

Primary Examiner—Paul N Dickson
Assistant Examiner—Michael R Stabley
(74) Attorney, Agent, or Firm—Shewchuk IP Services, LLC; Jeffrey D. Shewchuk

(57) ABSTRACT

A hitch includes a control linkage having a single handle on a control bar. The control linkage doubles to provide both a positive safety feature and a movement feature to the hitch, permitting single handed operation of both the positive safety feature and the opening of the hitch with the single handle. A release throw of four inches or less opens jaws of the hitch. A latch is included which can secure the control bar in either a secured position or in a release position. A follower is secured to one of the jaws to maintain timing between the jaws, and the follower doubles as a hitch position indicator so an operator to easily visually discern the position of the hitch. By including kingpin recesses of appropriate location and depth on the jaws, the hitch can be used with or without a lube plate over the skid plate.

17 Claims, 10 Drawing Sheets

U.S. PATENT DOCUMENTS

| | | | |
|---|---|---|---|
| 6,135,482 A * | 10/2000 | Larkin | 280/416.1 |
| 6,170,850 B1 * | 1/2001 | Works | 280/433 |
| 6,276,244 B1 * | 8/2001 | Fisher et al. | 82/113 |
| 6,357,777 B1 * | 3/2002 | Linger et al. | 280/441 |
| 6,398,249 B1 * | 6/2002 | Lindenman et al. | 280/434 |
| 6,485,045 B1 * | 11/2002 | King | 280/417.1 |
| 6,533,308 B1 | 3/2003 | Tambornino | |
| 6,557,883 B2 * | 5/2003 | Linger et al. | 280/441 |
| D495,279 S | 8/2004 | Lindenman et al. | |
| 6,846,000 B2 * | 1/2005 | Grinde et al. | 280/439 |
| 6,935,650 B2 * | 8/2005 | Grinde et al. | 280/435 |

* cited by examiner

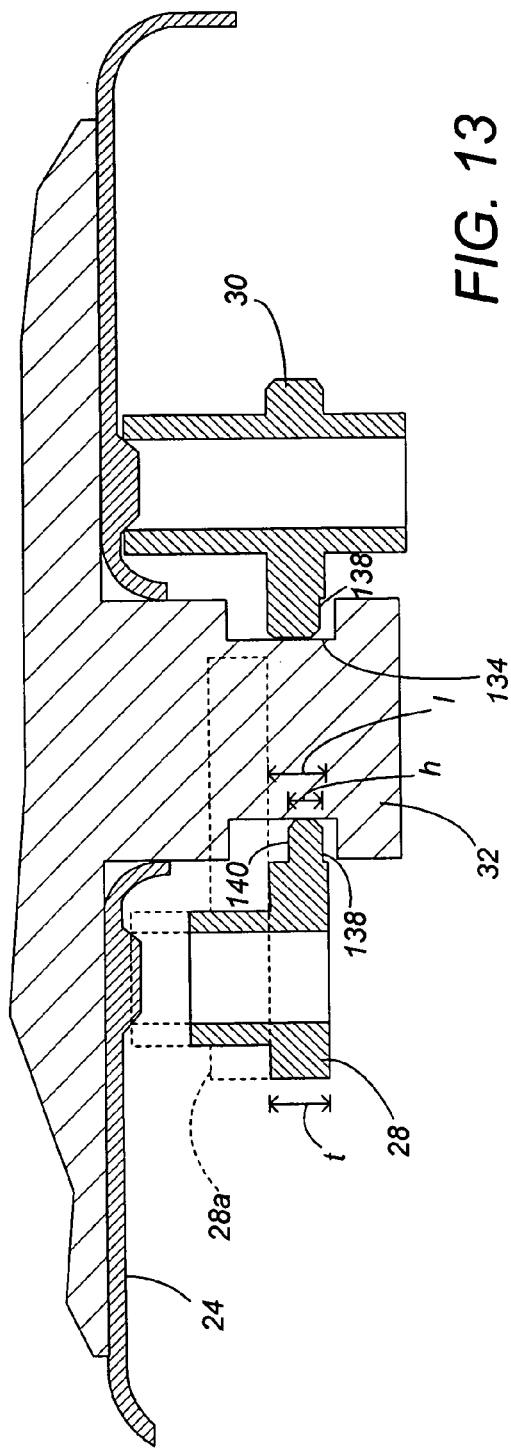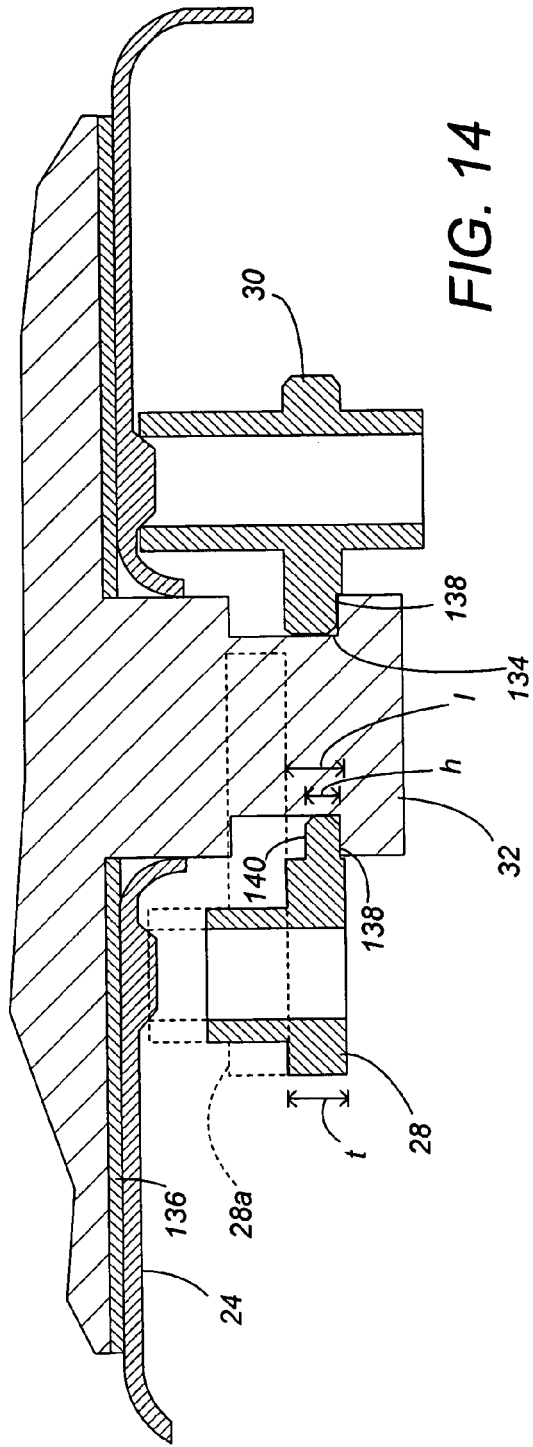

TRAILER HITCH

CROSS-REFERENCE TO RELATED APPLICATION(S)

None.

BACKGROUND OF THE INVENTION

The present invention relates to trailer hitches, and more particularly, to trailer hitches for fifth wheel or gooseneck type trailers supported such as in the bed of a pick-up truck and which are operated by mechanical controls.

Fifth wheel and gooseneck type trailers are used with pick-up trucks to support and tow a trailer by placing the weight and load of the trailer generally over the rear axle of the pick-up truck rather than over or adjacent the rear bumper. Hitches for fifth-wheel and gooseneck trailers have found a large and long-standing acceptance in the marketplace for towing a wide variety of trailers.

One common type of fifth-wheel trailer includes a kingpin which extends generally vertically on the leading tongue of the trailer. The hitch engages the trailer by surrounding the kingpin. One example of such a fifth-wheel hitch is disclosed in U.S. Pat. Nos. 6,846,000 and 6,935,650, which includes two movable plates or jaws which engage around the kingpin. The hitch disclosed in U.S. Pat. Nos. 6,846,000 and 6,935,650 has a control lever for moving the jaws to release the kingpin. A safety pin provides a positive locking feature which prevents unintended release of the hitch.

An example of a gooseneck hitch is disclosed in U.S. Pat. No. 6,533,308, which includes a pop-up ball rather than kingpin engaging jaws. The gooseneck hitch disclosed in U.S. Pat. No. 6,533,308 includes a raising/lowering linkage with a handle which extends into the rear wheel well of the pick-up truck, a convenient spot for the operator to control the operation of the hitch without climbing into the bed of the pick-up truck.

The average operator of a fifth-wheel or gooseneck hitch is not young, such as over 55 years old, who is perhaps not as strong and nimble as he or she once was. The controls of the hitch should be readily accessible by the operator, without requiring too much climbing or bending to access. Operation of the controls should not require the application of excessive force or torque. The hitch must be strong to securely engage the trailer, minimizing the possibility of breakage or of any way the trailer could inadvertently come loose. At the same time, the hitch should be simple to operate, so the operator has no difficulty in intentionally engaging and disengaging the trailer. The hitch should preferably be mechanically operated, so there is no possibility of a loss of power preventing operation of the hitch. The hitch must be robust and reliable, to last for carefree operation over the life of at least one vehicle, and possibly over the life of several vehicles, despite the fact that the hitch will likely be openly exposed to weather over its years or decades of use. As much as possible, the hitch should also have minimal cost and expense in manufacturing and assembly.

BRIEF SUMMARY OF THE INVENTION

The present invention is a hitch, a control linkage for a hitch and a method of hitch operation. In one aspect, a single handle, with a short release throw, moves a control rod both to provide a safety function and to open the hitch. In another aspect, the control rod translates in a sleeve, and a latch is included which can secure the control bar in either a secured position or in a release position. In another aspect, a follower is secured to one of the jaws to maintain timing between the jaws, and the follower doubles as a hitch position indicator so an operator to easily visually discern the position of the hitch. By including kingpin recesses of appropriate location and depth on the jaws, the hitch can be used with or without a lube plate over the skid plate. In another aspect, the jaws are mounted with a bearing structure which is stiffer in roll than in pitch.

BRIEF DESCRIPTION OF THE DRAWINGS

FIG. 13 is a simplified cross-sectional elevational view of the hitch about a kingpin, showing the release position of the controlled jaw in dashed lines.

FIG. 14 is a simplified cross-sectional elevational view of the hitch about a kingpin with a lube plate over the skid plate, showing the release position of the controlled jaw in dashed lines.

While the above-identified drawing figures set forth one or more preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
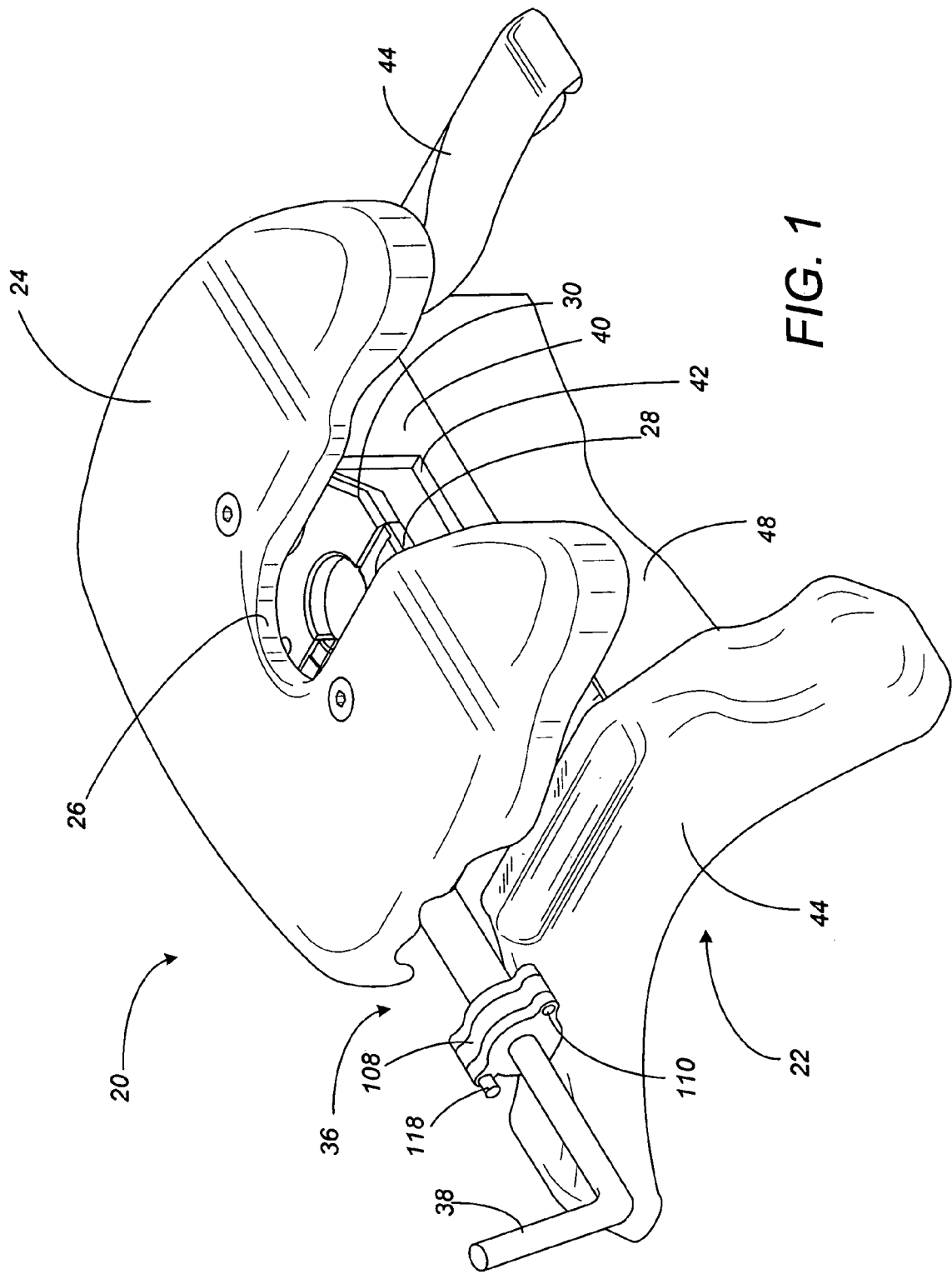
FIG. 1 is a perspective view from above showing a preferred embodiment of a hitch in accordance with the present invention.
Figure 2:
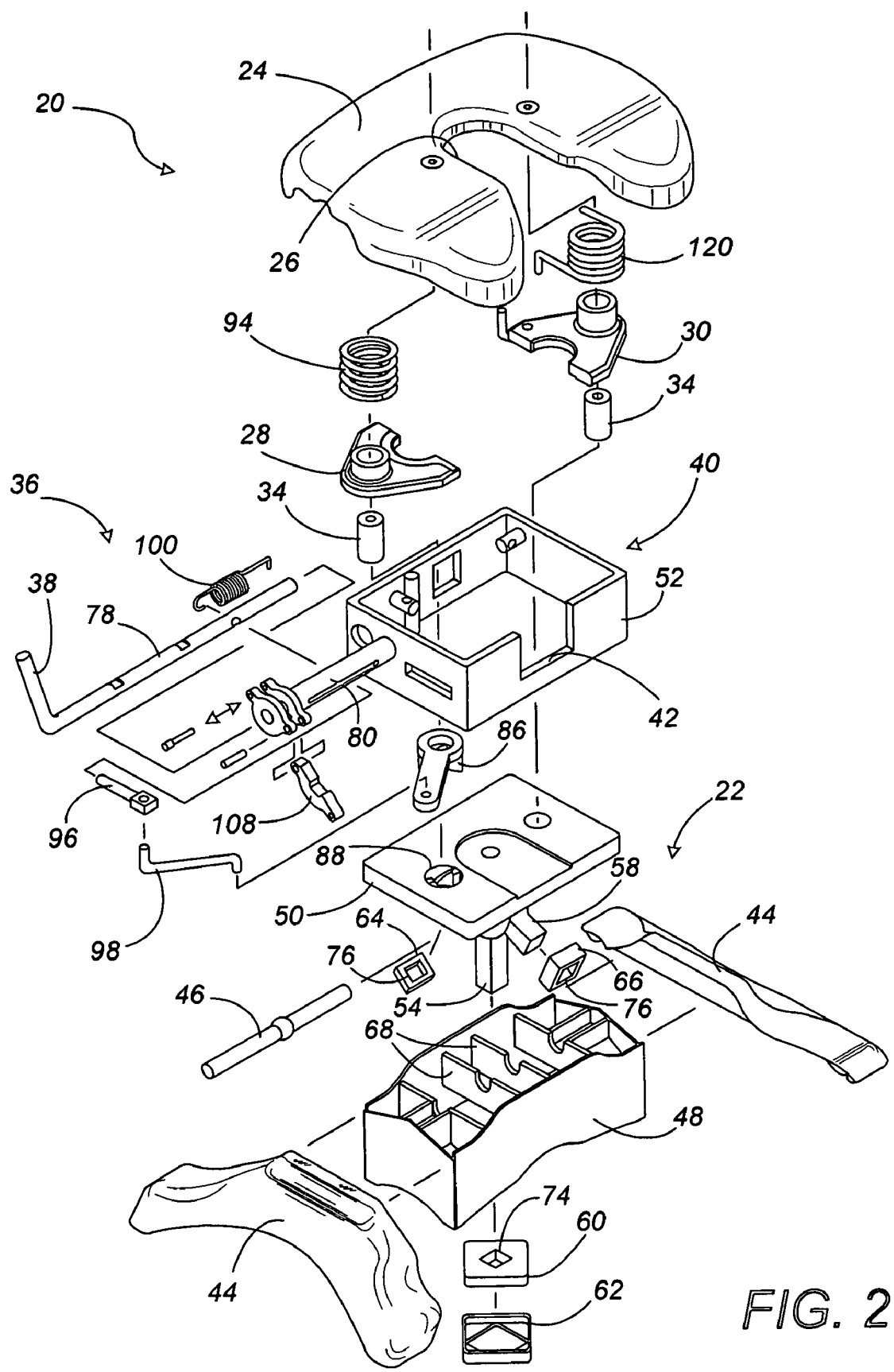
FIG. 2 is an exploded perspective view of the hitch of FIG. 1.

As shown in FIGS. 1 and 2, a preferred embodiment of a hitch 20 in accordance with the present invention includes a support frame 22 which permits attachment of the hitch 20 into the bed of a pick-up truck (not shown). A skid plate 24 provides the top surface of the hitch 20 and defines a king-pin receiving slot 26. The skid plate 24 may embody an ornamental design such as described in U.S. patent application Ser. No. 29/257,292 , now issued at U.S. Pat. No. D560,143, assigned to the assignee of the present invention and incorporated by reference. Two jaws 28, 30 are positioned under the skid plate 24 and are used as a kingpin retention structure to engage the kingpin 32 (shown in FIGS. 13 and 14) of a towed vehicle (not shown). The jaws 28, 30 are rotationally attached each on a hub 34. One of the jaws is a controlled jaw 28, moveable in the height direction on its hub 34, while the other jaw is a fixed height jaw 30. A linkage 36 controls operation of the jaws 28, 30, with the linkage 36 being operable via a handle 38. The jaws 28, 30 are supported by and protected in a jaw housing 40, which in turn is supported by the support frame 22. The jaw housing 40 has a kingpin opening 42 on its aft wall.

As better shown in FIG. 2, the preferred support frame 22 generally includes legs 44 and a bearing structure 46, with the bearing structure 46 supported by a bearing undercarriage 48. The preferred legs 44 are provided as identical right and left side legs, and provide an appearance of right to left and front to back symmetry to the hitch 20. The bearing undercarriage 48 mounts between the right and left side legs 44. For instance, the legs 44 may embody the ornamental design described in U.S. patent application Ser. No. 29/257,291, now issued as U.S. Pat. No. D572,633, assigned to the assignee of the present invention and incorporated by reference. If desired, the frame 22 may permit fore and aft, height, and side-to-side flexibility in mounting position. A basic frame structure is disclose in U.S. Pat. Nos. 6,846,000 and 6,935,650 to Grinde et al., owned by the assignee of the present invention and incorporated herein by reference. The present invention is disclosed and explained as an improvement of the hitch and frame structure of U.S. Pat. Nos. 6,846,000 and 6,935,650, but the various aspects of the invention can be used with a wide variety of other hitch and frame structures.

The preferred bearing structure is a shaft-supported spherical bearing 46 to permit angular movement in all directions (other than elevation) of the skid plate 24 and jaws 28, 30, enabling the hitch 20 to permit angled pitch and roll movement of the kingpin 32 as the vehicle traverses over hills, across side slopes, around corners, etc., when the trailer rides on an undulating roadplane behind the towing vehicle. The bearing undercarriage 48 supports the bearing shaft 46 at several locations along its length.

Figure 2A:
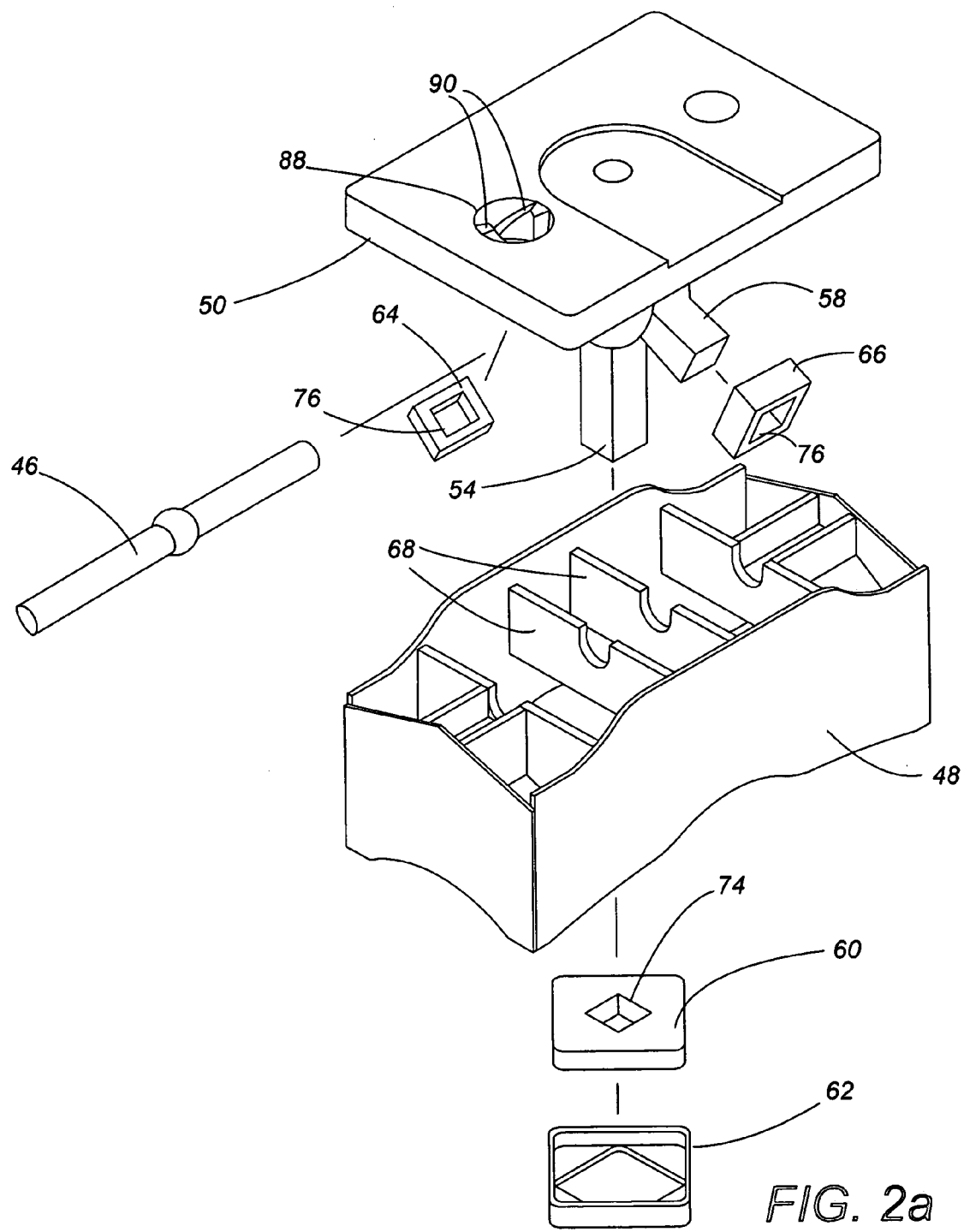
FIG. 2a is an enlarged view of a portion of FIG. 2, showing the bearing components of the preferred embodiment.
Figure 3:
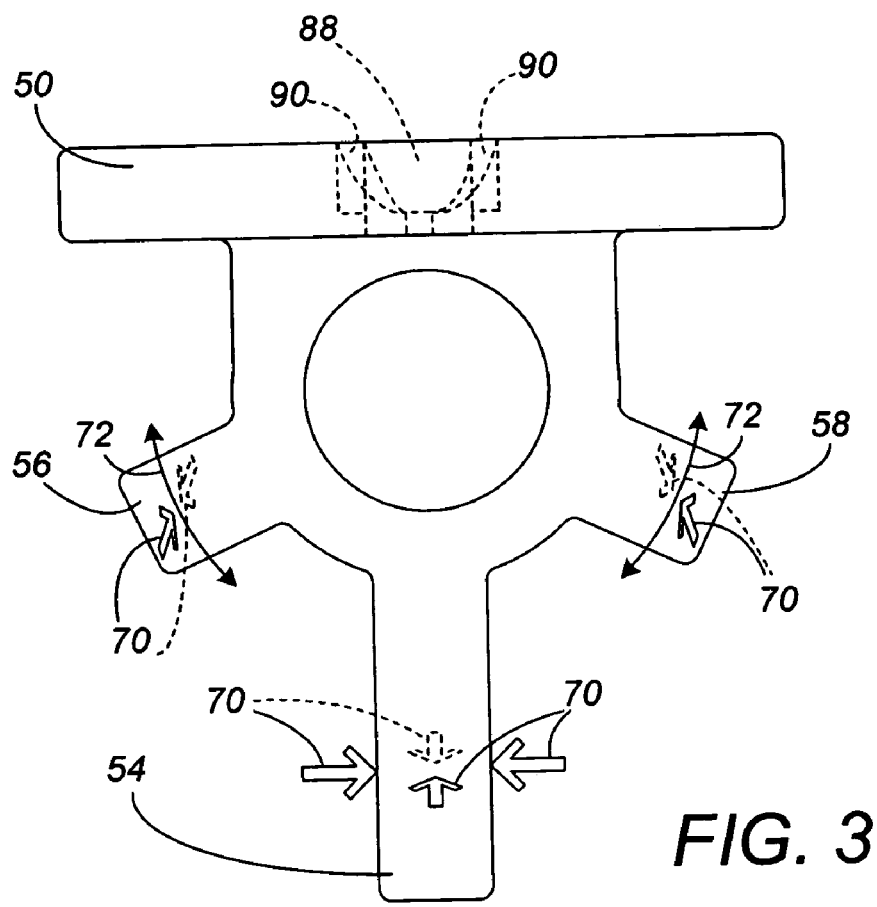
FIG. 3 is a side view of the preferred base plate.

The bottom of the jaw housing 40 is provided by a base plate 50 as shown in FIGS. 2, 2a and 3. A peripheral side wall 52 fixedly attaches to the base plate 50 such as through a bolted or welded connection. The bearing structure 46 preferably biases the jaw housing 40 toward an aligned position, wherein the jaw housing 40 (and the jaws 28, 30 mounted therein) are in a plane parallel to a bottom attachment plane defined by the legs 44 of the frame 22, i.e., parallel to the plane of the bed of the truck into which the hitch 20 is attached.

In the preferred embodiment, the base plate 50 includes three extension bars 54, 56, 58 for alignment biasing: a central extension bar 54, a fore extension bar 56 and an aft extension bar 58. The extension bars 54, 56, 58 all preferably extend radially relative to the center of the spherical bearing 46. In the preferred configuration, the extension bars 56, 54, 58 are one behind the other, in a fore-aft plane perpendicular to the base plate 50 (i.e., a generally vertical fore-aft plane).

A bottom elastomeric pad 60 is provided which mates around the central extension bar 54, biasing the central extension bar 54 back toward an aligned position. The bottom elastomeric pad 60 is retained in a bottom pad housing 62, which attaches to the bearing undercarriage 48 and keeps the bottom elastomeric pad 60 in a generally constant position relative to the bearing undercarriage 48. When the jaw housing 40 is not in the aligned position, the central extension bar 54 causes compression of the bottom elastomeric pad 60 in the direction that the central extension bar 54 is out of alignment. The bottom elastomeric pad 60 responds against the compression force, biasing the central extension bar 54 horizontally, in a radial direction relative to the longitudinal axis of the central extension bar 54, back toward the aligned vertical position, in the exact radial direction needed for alignment.

A fore elastomeric pad 64 mates around the fore extension bar 56, and an aft elastomeric pad 66 mates around the aft extension bar 58. The fore and aft elastomeric pads 64, 66 are received between two cross-members 68 of the bearing undercarriage 48. The fore and aft elastomeric pads 64, 66 have a width which matches the width of the opening between the two cross-members 68. However, in contrast to the bottom elastomeric pad 60 as constrained by the bottom pad housing 62, the cross-members 68 permit the fore and aft elastomeric pads 64, 66 to slide in the fore and aft directions.

The bottom elastomeric pad 60 provides an alignment biasing force which is generally consistent both in pitch and in roll of the towed trailer relative to the towing vehicle. For instance, a 2° roll offset of the base plate 50 creates an alignment force in the bottom elastomeric pad 60 of the same magnitude as a 2° pitch offset of the base plate 50, though the 2° roll offset creates a sideways force while the 2° pitch offset creates a fore-aft force. All 2° offsets which are combinations of pitch and roll will also provide a compression force in the bottom elastomeric pad 60 of the same general magnitude, just in the proper direction for alignment.

In contrast to the relatively equal pitch and roll forces provide by the bottom elastomeric pad 60, the fore and aft elastomeric pads 64, 66 provide essentially no pitch alignment force. When the towing vehicle traverses over hills and valleys with no side slope, the hitch 20 will allow pitch offset in which the fore and aft elastomeric pads 64, 66 will not compress but will merely slide fore and aft between the cross-members 68. When the towed trailer rolls relative to the towing vehicle, the roll will cause the fore and aft elastomeric pads 64, 66 to compress and providing a horizontally sideways correction force. Thus, the fore and aft elastomeric pads 64, 66 cause the hitch 20 to be stiffer against roll than against pitch. The higher roll stiffness is illustrated in FIG. 3 by the arrows, wherein the larger arrows 70 indicate the compressive force which can be provided by the elastomeric pads 60, 64, 66 and the lined arrows 72 represent the translation in the pitch direction without compression permitted by the fore and aft elastomeric pads 64, 66. The amount of roll stiffness and the amount of pitch stiffness can be easily selected by a worker skilled in the art by appropriately sizing the bottom elastomeric pad 60 relative to the fore and aft elastomeric pads 64, 66, and by selecting the moment arm of each of the elastomeric pads 60, 64, 66 on their respective extension bars 54, 56, 58.

The shape of the bottom elastomeric pad 60, the opening 74 of the bottom elastomeric pad 60 for receiving the central extension bar 54, and the cross-sectional shape of the central extension bar 54 are preferably all square just for ease of manufacturing and assembly. The shape of the fore and aft elastomeric pads 64, 66, the openings 76 of the fore and aft elastomeric pads 64, 66 for receiving the fore and aft extension bars 56, 58, and the cross-sectional shape of the fore and aft extension bars 56, 58 are preferably all square just for ease of manufacturing and assembly. The hitch 20, including the bottom and fore and aft elastomeric pads 60, 64, 66, does not provide a significant alignment force in the yaw direction, as the kingpin 32 is cylindrical and transmits essentially no yaw force to the jaws 28, 30.

As one alternative to elastomeric pads 60, 64, 66, the alignment force for the bearing structure 46 could be provided by other biasing members, such as springs. Elastomeric pads work well for the alignment force because they can provide the compression force in all directions, which ever direction is needed to make the correction into alignment.

As better shown in FIGS. 2b and 6-12, the jaws 28, 30 are operated by a control rod 78 through the linkage 36. The handle 38 is at the proximal end of the control rod 78, bent at an angle relative to the longitudinal axis of the control rod 78. With the handle 38, an operator can easily apply a translational motion pulling or pushing the control rod 78 along its longitudinal axis. The control rod 78 generally translates between a closed position, wherein the control rod 78 extends over the controlled jaw 28, and a release position wherein the control rod 78 is pulled back off the surface of the controlled jaw 28.

The control rod 78 extends through a slotted sleeve 80. The slotted sleeve 80 provides support for the control rod 78, maintaining the control rod 78 on its longitudinal axis. The slotted sleeve 80 can be directly supported by the frame 22, but more preferably is rigidly attached to the jaw housing 40 to move with the jaws 28, 30 and jaw housing 40 on the bearing structure 46. A slot 82 on the slotted sleeve 80 allows an attachment link 84 to extend through the slotted sleeve 80 and connect to the control rod 78.

Figure 4:
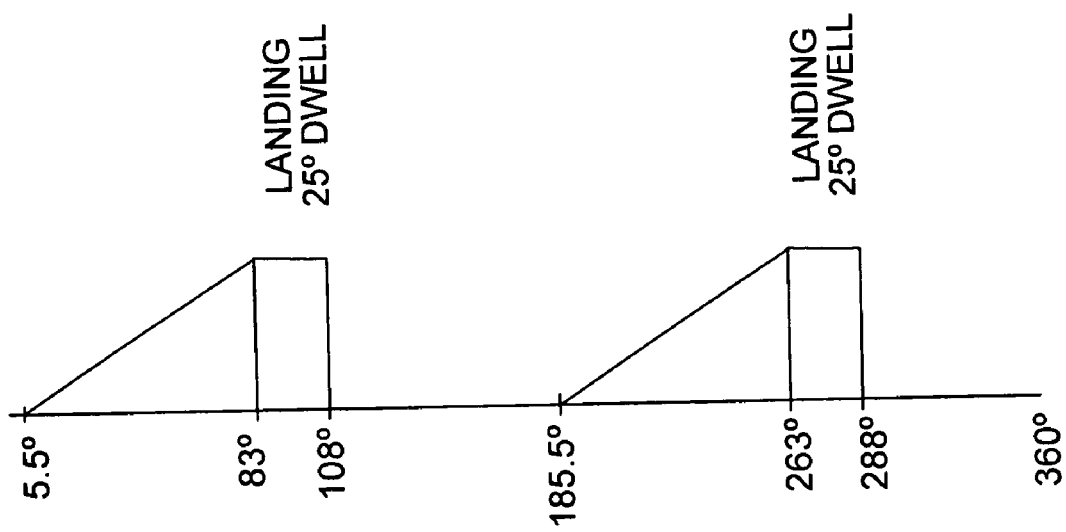
FIG. 4 is a diagram of the preferred cam ramps of the base plate of FIG. 3.

A spiral lift cam 86 is positioned on the hub 34 underneath the controlled jaw 28. The spiral lift cam 86 operates essentially as disclosed in U.S. Pat. Nos. 6,846,000 and 6,935,650. The base plate 50 includes a mating opening 88 for the spiral lift cam 86. The mating opening 88 has one or more ramps 90, which cooperate with ramps 92 on the bottom of the spiral lift cam 86. The preferred profile for the ramps 90 is shown in FIG. 4, which shows two opposing ramps operating over a throw of about 78°, and then has a 25° landing dwell.

Figure 2B:
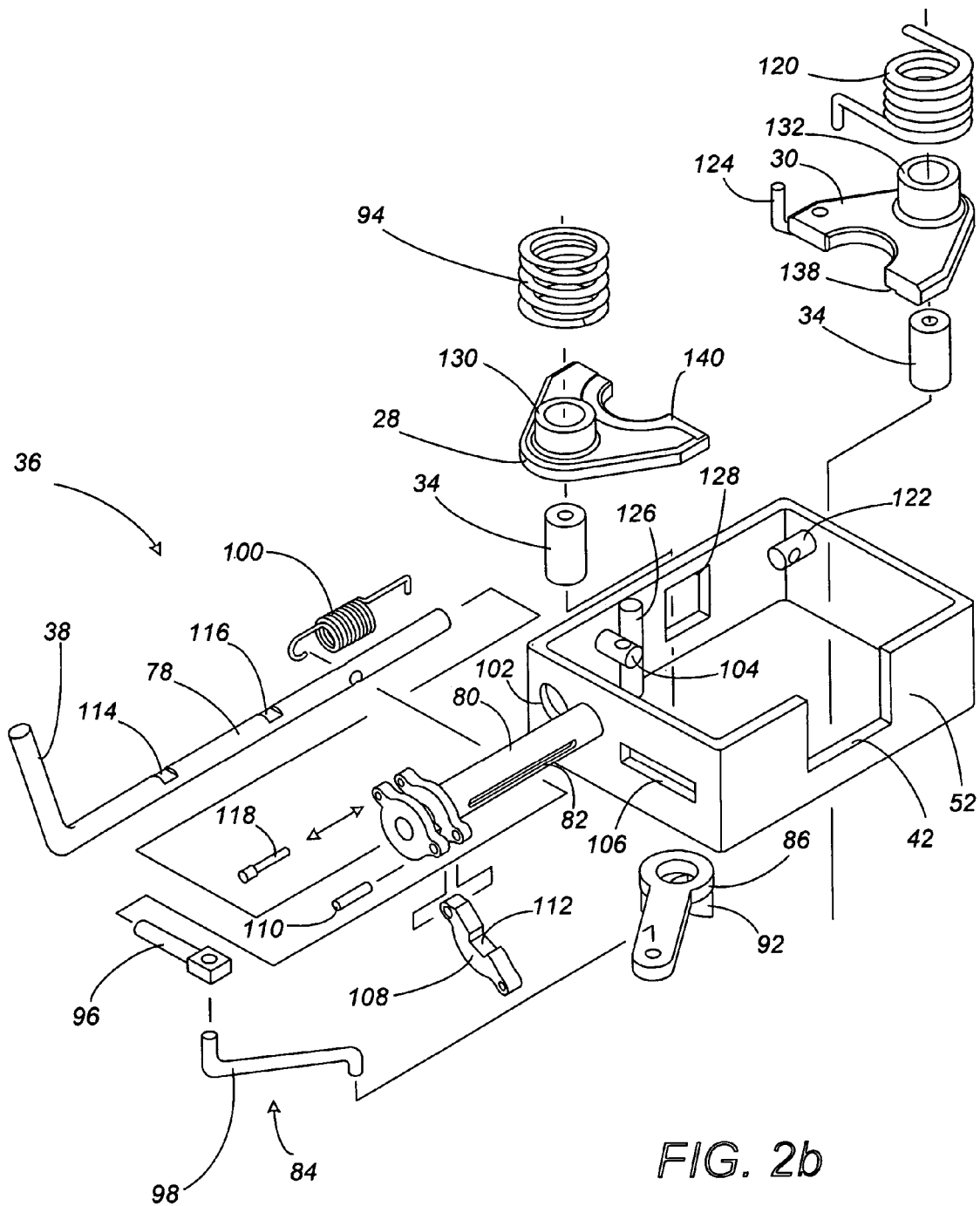
FIG. 2b is an enlarged view of a portion of FIG. 2, showing the control linkage components of the preferred embodiment.
Figure 11:
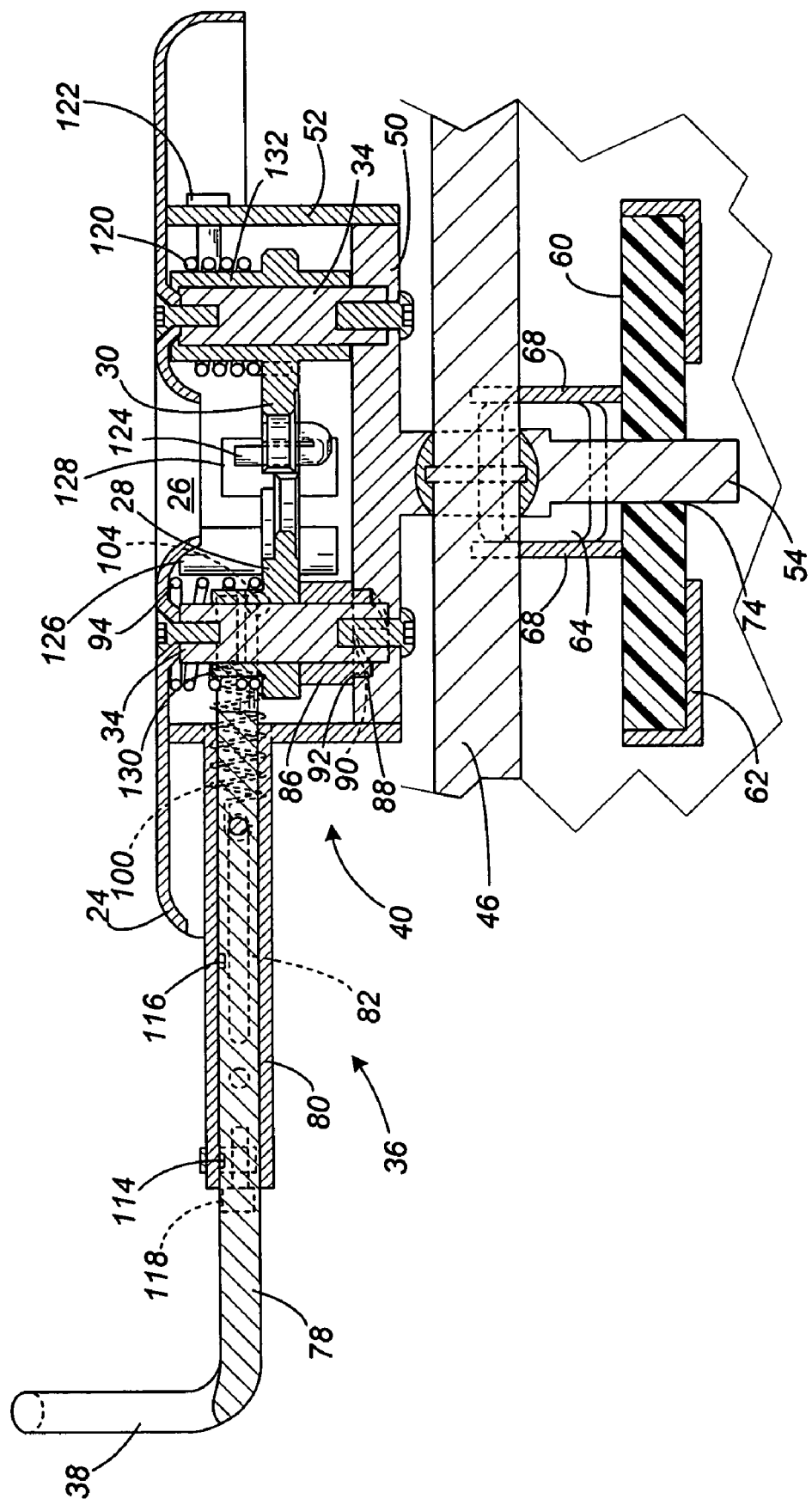
FIG. 11 is a cross-sectional view of a portion of the preferred hitch in the closed, locked position, taken along lines 11-11 of FIG. 5.
Figure 12:
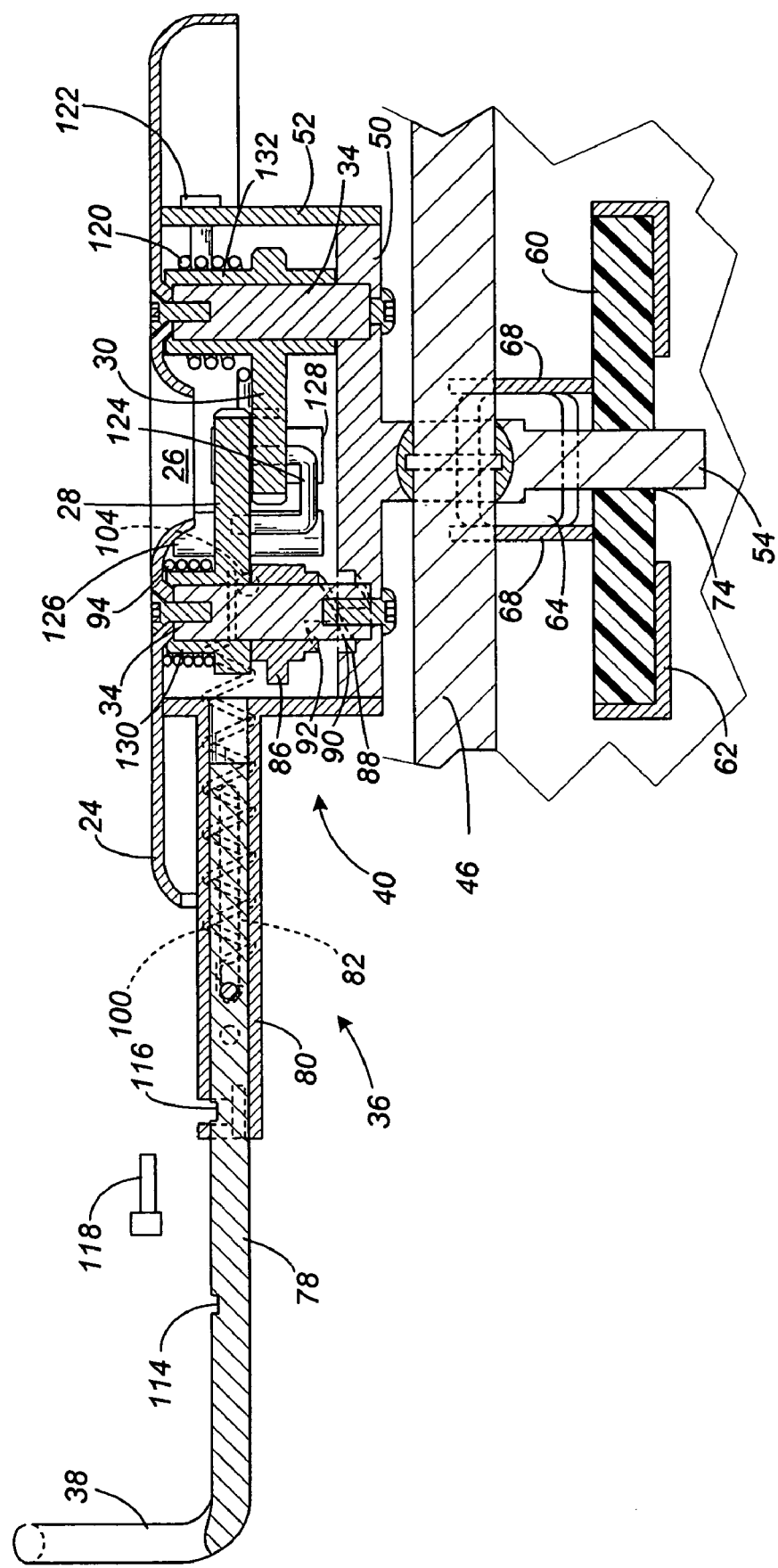
FIG. 12 is a cross-sectional view of the same portion of the preferred hitch in the fully open position, taken along lines 12-12 of FIG. 8.

As best shown in FIGS. 2b, 11 and 12, a compression spring 94 biases the controlled jaw 28 and the underlying spiral lift cam 86 downward. When the spiral lift cam 86 is pivoted about the hub 34, the ramps 92 on the bottom of the spiral lift cam 86 ride up the ramps 90 on the mating opening 88, raising the spiral lift cam 86 and the controlled jaw 28 above it against the compression spring 94.

The preferred attachment link 84 includes an attachment pin 96 and an attachment bar 98. The attachment pin 96 extends through the control bar 78 and resides in the slots 82 of the slotted sleeve 80. The attachment bar 98 pivotally connects the attachment pin 96 to the spiral lift cam 86. A distal end of the attachment pin 96 is connected to a tension spring 100. The tension spring 100 extends through a tension spring window 102 in the jaw housing wall 52, and the opposite end of the tension spring 100 biases off a tension spring mount 104 fixed on the jaw housing 40. The attachment bar 98 extends through an attachment bar window 106 on the jaw housing 40. The size of the attachment bar window 106 should permit side-to-side angular movement of the attachment bar 98 and the spiral lift cam 86 as the control linkage 36 moves between the closed and release positions. The size of the attachment bar window 106 should also permit some angular up-and-down movement of the attachment bar 98 as the spiral lift cam 86 rises or lowers relative to the fixed height of the slotted sleeve 80. When the control bar 78 is pulled or pushed within the slotted sleeve 80, the attachment pin 96 translates with the control bar 78. The attachment bar 98 then torques the spiral lift cam 86 about the movable jaw hub 34. The tension spring 100 biases the control bar 78 toward the closed position, with the spiral lift cam 86 nesting downward in the mating opening 88.

A latch 108 permits the control bar 78 to be secured at either the closed position or at the release position. The preferred latch 108 is hinged relative to the slotted sleeve 80 with a hinge pin 110, and includes an interference flat 112 which mates with either a closed latch recess 114 or a release latch recess 116 on the control bar 78. The latch 108 can then be held downward into an interference position, mating with either the closed latch recess 114 or the release latch recess 116, with a safety pin 118. With the latch 108 in the interference position, the latch 108 prevents translation of the control bar 78. If desired, the latch 108 may be either biased open or biased closed such as with a spring (not shown), which would minimize rattling of the latch 108 in the interference position during towing and affect how the latch 108 moves into and out of the interference position. However, the preferred embodiment allows the latch 108 to freely rotate about the hinge pin 110 under only gravitational forces, which lightly bias the latch 108 either toward the interference position or toward an open position depending upon where the latch 108 is released in its hinged arc.

The fixed height jaw 30 is preferably biased toward an open position. In the preferred embodiment, a torsion spring 120 is mounted about the fixed height hub 34, providing a biasing force from a torsion spring mount 122 fixed on the jaw housing 40 to a side of the fixed height jaw 30.

A follower 124 is mounted on the fixed height jaw 30 in a configuration for cooperating with the controlled jaw 28. The preferred follower 124 is formed from bent bar stock which is welded or otherwise fixedly secured to the fixed height jaw 30. The follower 124 causes the controlled jaw 28 to open with the opening of the fixed height jaw 30. A stop 126 is provided which stops the controlled jaw 28 from rotating past the closed position. The follower 124 and the stop 126 together ensure that the two jaws 28, 30 do not get "out-of-time" wherein one jaw in the open position nests in the other jaw in the closed position.

A viewing opening 128 in the fore side of the jaw housing 40 permits operator viewing of the follower 124 from the cab of the vehicle. The slots 82 in the slotted sleeve 80 permit operator viewing of marked portions of the control rod 78. For instance, green dots may be painted on the control rod 78 and on the follower 124 which are only visible when the fixed height jaw 30 is rotated back into the closed position and when the control rod 78 is in the closed position indicating that the controlled jaw 28 is positioned downward beneath the distal end of the control rod 78. In its preferred configuration, the position indicator dot(s) is/are viewable from the forward side of the hitch 20, so the operator can check the position indicator from the cab of the pick-up truck prior to driving with the towed vehicle, thereby ensuring that the kingpin 32 is locked in the hitch 20. The operator should only drive with a towed vehicle after checking to make sure the position indicator is "green" signifying that the hitch 20 is locked closed. A yellow dot may be painted on the control rod 78 which is visible through the sleeve 80 only when the control rod 78 is in an intermediate position indicating that the controlled jaw 28 is ready to receive the kingpin 32. A red dot may be painted on the control rod 78 which is visible only when the controlled jaw 28 is fully opened into the release position, signifying that the hitch 20 will not lock about a kingpin 32 but rather is uncoupled from the kingpin 32.

Figure 5:
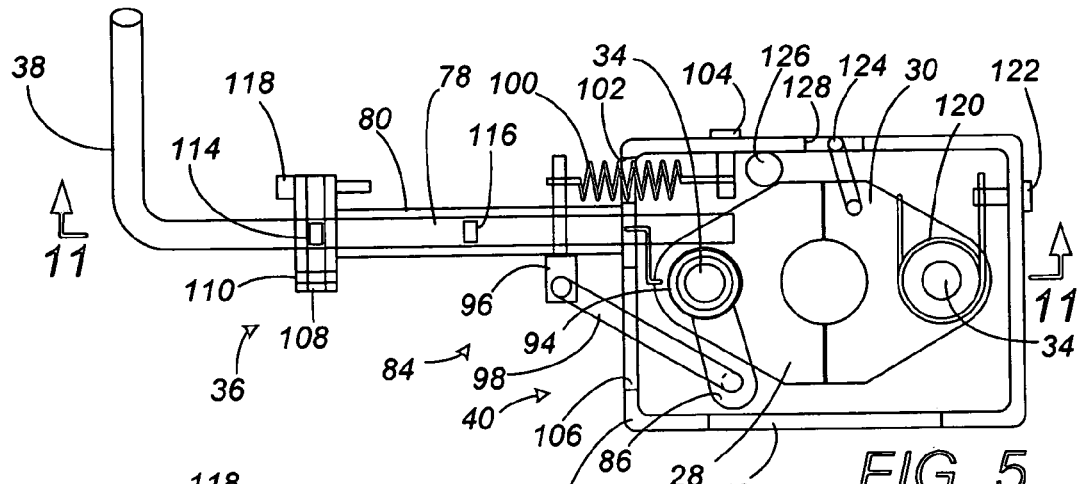
FIGS. 5-10 are simplified plan views of the control linkage components, showing operation of the hitch from a closed, locked position (FIG. 5), in time steps (FIGS. 6 and 7) to a fully open position (FIG. 8), and then in time steps (FIGS. 9 and 10) before returning to the closed, locked position (FIG. 5).

Operation of the hitch 20 is explained with reference to FIGS. 5-12. As shown in FIG. 5, the hitch 20 is depicted as beginning in a closed, locked position. The controlled jaw 28 is biased downward by the compression spring 94. The controlled jaw 28 is further positively held downward by the control bar 78 extending over the top surface of the jaw 28. With the controlled jaw 28 in its downward position, it mates with the fixed height jaw 30 and cannot pivot or open. With the control bar 78 in place positively securing the controlled jaw 28 down, there is no possibility of the controlled jaw 28 rising up out of plane with the fixed height jaw 30 to an unsecured position. The control bar 78 is biased by the tension spring 100 to an extended position (to the right in FIG. 5). The follower/position indicator 124 is in its forward position, visible to an operator in the cab of the vehicle to signify that the jaws 28, 30 are closed and secured. The latch 108 is closed into an interference position, and held closed by the safety pin 118.

When the operator of the hitch 20 wants to release the trailer from the hitch 20, first the safety pin 118 is pulled, and the latch 108 is opened. Then the control handle 38 is pulled as shown by arrow A in FIG. 6. The operator must pull sufficiently hard to overcome the biasing force of the tension spring 100, but the handle 38 extends at a right angle to the pull direction, making it easy for an operator transmit a significant pull force to intentionally overcome the spring bias when desired. As the control handle 38 begins to move, the attachment bar 98 pulls the spiral lift cam 86 and the spiral lift cam 86 begins to rotate about the hub 34. The spiral lift cam 86 rotates towards the landing dwell without lifting, until the control bar 78 has been retracted (translated) beyond the top surface of the controlled jaw 28.

Figure 6:
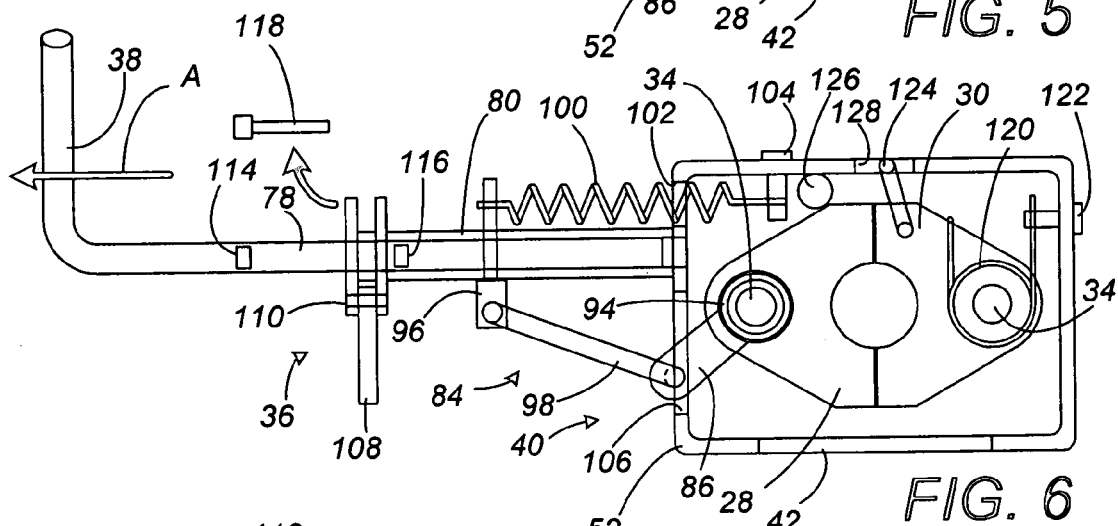

Once the control bar 78 clears the top surface of the controlled jaw 28, the ramps 92 on the spiral lift cam 86 ride up the ramps 90 in the base plate 50, lifting the spiral lift cam 86 and the controlled jaw 28 against the compression spring 94. The pull force must now overcome the combined force of both the tension spring 100 and the compression spring 94 (through the ramp angle), as well as the gravitational force on the controlled jaw 28 and the spiral lift cam 86. However, the tension spring 100 and the compression spring 94 need not have high spring constants, so a pull force on the order of 5 to 25 pounds can open the hitch 20. FIG. 6 shows the hitch 20 during the opening motion just after the spiral lift cam 86 has begun rising. At this point, if the operator releases pull on the handle 38 without completing a full release stroke, the hitch 20 will react to the forces of the tension spring 100 and the compression spring 94 and return to the closed position of FIG. 5.

Figure 7:
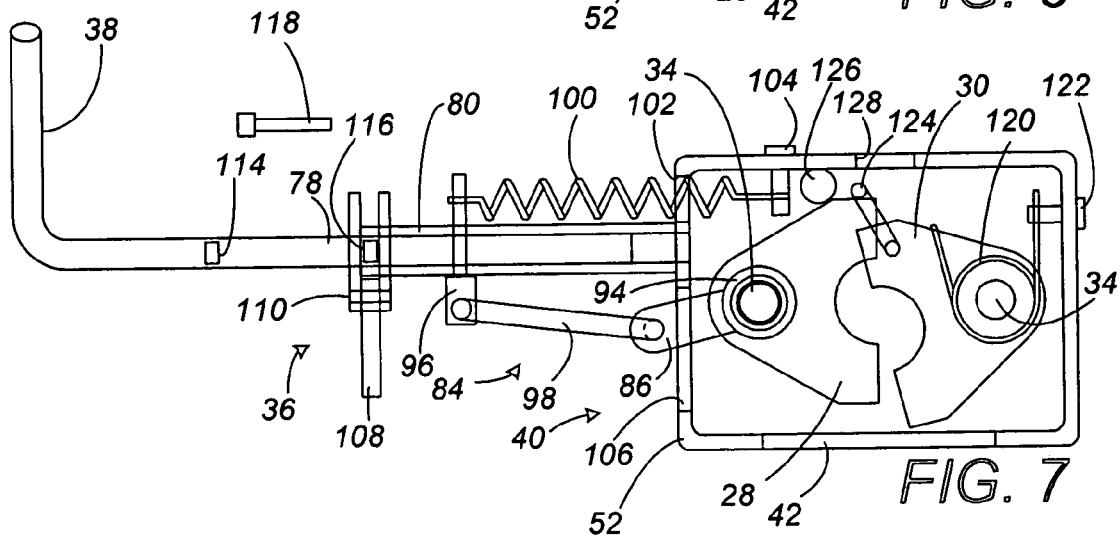

If the operator continues pulling on the handle 38, the control linkage 36 will continue to pull the spiral lift cam 86 clockwise (as shown in FIG. 7) which continues to raise the controlled jaw 28 to an elevation where it clears the fixed height jaw 30. The total release of the hitch 20 is achieved in a handle throw of only about 3 to 6 inches and preferably a complete handle throw of 4 inches or less.

Once the controlled jaw 28 clears the fixed height jaw 30, the torsion spring 120 on the fixed height jaw 30 biases the fixed height jaw 30 open, pivoting counterclockwise about the fixed height hub 34. Due to this rotation, the follower 124 contacts the controlled jaw 28 in the position shown in FIG. 7. The stop 126 is most important at this time, as it prevents the controlled jaw 28 from the possibility of pivoting counterclockwise into an out-of-time position with respect to the fixed height jaw 30. Additionally, friction between the spiral lift cam 86 and the controlled jaw 28 creates the tendency for the controlled jaw 28 to pivot in the same direction as the spiral lift cam 86, clockwise. With the controlled jaw 28 prevented from counterclockwise rotation due to the stop 126 and started in the clockwise direction due to friction with the spiral lift cam 86, the follower 124 readily continues the opening of the controlled jaw 28 under the force of the torsion spring 120. The hitch 20 opens and tends to "eject" the formerly held kingpin 32, so the hitch 20 can be driven away from the towed vehicle and its kingpin 32.

If desired, the hitch 20 may be secured in this fully open position by closing the latch 108 and securing the latch 108 with the safety pin 118. In many instances, the weight of the trailer and the frictional reluctance of the trailer to move (for a "heavy load") will be greater than the opening force provided by the torsion spring 120. That is, the hitch 20 will not eject a heavy load upon reaching the release position. In such cases, merely raising the controlled jaw 28 to the release position will not by itself open the hitch 20, and releasing of the pull force on the handle 38 prior to closing the latch 108 into the release recess 116 will cause the hitch 20 to revert back to the closed position of FIG. 5 under the force of the tension spring 100 and the compression spring 94. With the hitch 20 held in the fully open position, the spiral lift cam 86 holds the controlled jaw 28 up and out-of-plane with the fixed height jaw 30, and the jaws 28, 30 will not unintentionally reclose around a kingpin 32. With a heavy load, the operator may use the "held open" position to drive the towing truck out from under the kingpin 32 of the heavy load, causing the hitch 20 to spring open to the position of FIG. 8. If desired, the operator may also take advantage of the "held open" hitch position during reattachment of the towed kingpin 32 to the hitch 20, i.e., while positioning the trailer and kingpin 32 to the general vicinity desired relative to the hitch 20. So long as the hitch 20 is in the "held open" position of FIGS. 8 and 12 (either due to force on the handle 30 or to the latch 108 engaging the release recess 116), there is no possibility of the controlled jaw 28 moving downward into a locked position.

Figure 8:
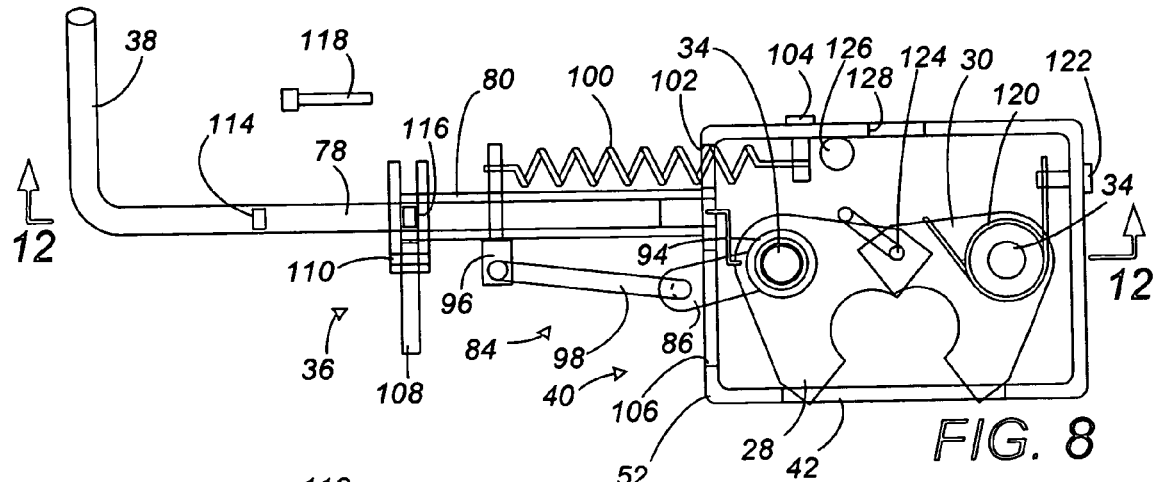
Figure 9:
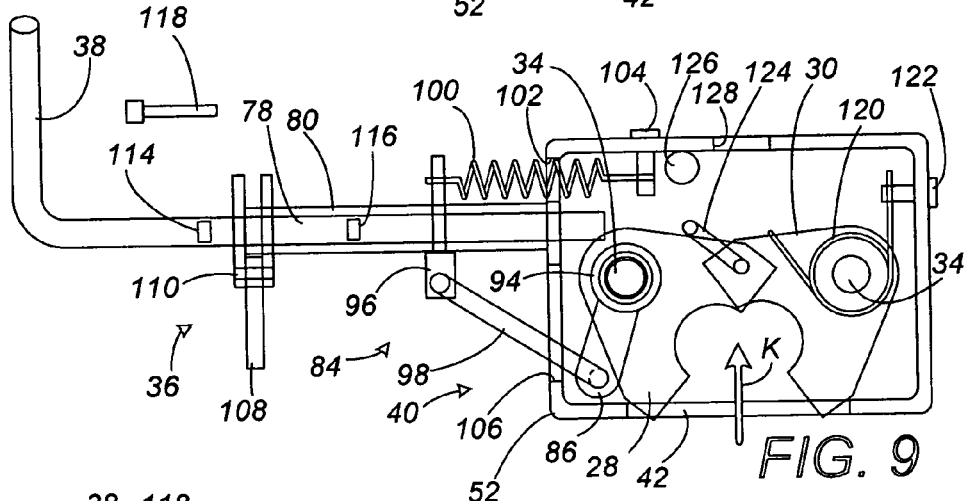
Figure 10:
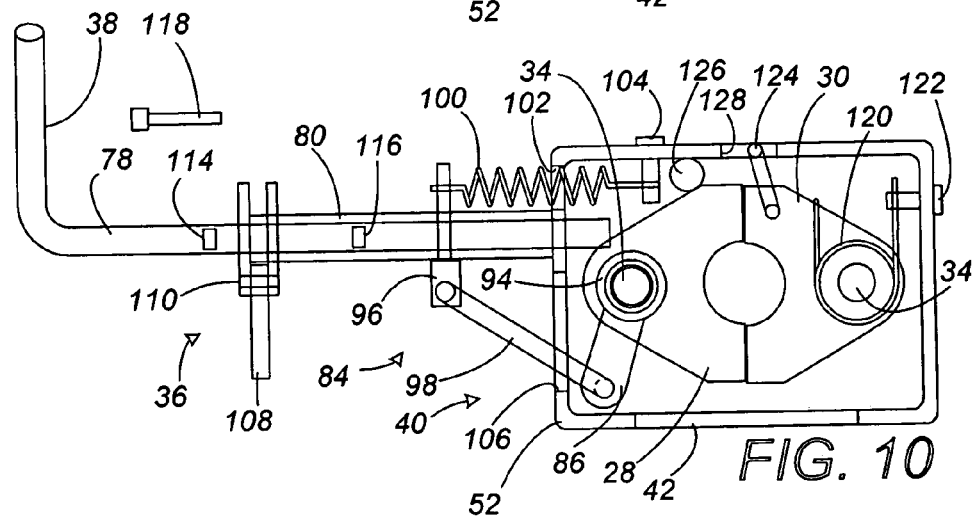

Once the kingpin 32 is no longer in the hitch 20, the torsion spring 120 fully opens the jaws 28, 30 to the release position shown in FIGS. 8 and 12. Once the fixed height jaw 30 is open, the rear corner of the fixed height jaw 30 prevents the controlled jaw 28 from moving back downward despite the biasing force of the compression spring 94. Typically after some time has passed after releasing the kingpin/trailer, the operator may desire to use the hitch 20 again. Opening of the latch 108 out of the release recess 116 (or releasing pull on the handle 38 without ever closing the latch 108) causes the handle 38 to translate back toward the controlled jaw 28 to the "load" position shown in FIG. 9. The force of the tension spring 100 moves the control bar 78 until the distal end of the control bar 78 contacts the controlled jaw 28. The spiral lift cam 86 has lowered back down relative to the base plate 50, but the controlled jaw 28 is still held at an elevated position due to the underlying fixed height jaw 30. The force of the torsion spring 120 keeps the jaws 28, 30 open even though the tension spring 100 and the compression spring 94 are biasing the controlled jaw 28 toward a closed position. However, this force balance is readily overcome when a kingpin 32 is pressed into the hitch 20. The kingpin 32 (shown in FIGS. 13 and 14) provides a pushing force K which is used to push the jaws 28, 30 backward until they close around the kingpin 32, to the position shown in FIG. 10. Once the jaws 28, 30 are aligned about the kingpin 32, the controlled jaw 28 clears the fixed height jaw 30, and the compression spring 94 forces the controlled jaw 28 downward into the plane of the fixed height jaw 30 and into engagement with the fixed height jaw 30. Once the controlled jaw 28 moves downward under the force of the compression spring 94, the control rod 78 is free to complete its movement over the controlled jaw 28 to the position shown in FIGS. 5 and 11. With the controlled jaw 28 in the "down" position, the follower/position indicator 124 is again visible through the view window to an operator in the cab of the pickup truck. Once the kingpin 32 is in place and engaged within the jaws 28, 30, the operator can close the latch 108, again creating positive interference between the latch 108 and the control rod 78 to prevent the control rod 78 from unintended movement.

As best shown in FIGS. 13 and 14, the vertical dimensions of the hitch 20 as it engages the kingpin 32 are quite important to ensure that the hitch 20 and jaws 28, 30 are appropriately strong to support the load of the kingpin 32 during towing. For instance, an upward force on the kingpin 32 will transmit to the jaws 28, 30 and then from each jaw 28, 30 to its hub 34 as a bending moment. To support bending moments at the connection between the jaws 28, 30 and the hubs 34, each of the jaws 28, 30 have a collar 130, 132 around its hub 34 (and inside the respective springs 94, 120) that, in the preferred embodiment has an inside diameter of about 25 mm and a height of at least about 27 mm. The two jaws 28, 30 mate to form a circular central opening for receiving a 50.8 mm (2 inch) diameter neck 134 on the standard kingpin 32. To transmit the towing force from the hubs 34 to the jaws 28, 30, the jaws 28, 30 are formed of 1045 steel and have a preferred height or thickness t of 16 mm. The spiral cam ramps 90, 92 have a lift height of cam action 1 which raises the controlled jaw 28 18 mm so the controlled jaw 28 will readily clear the fixed height jaw 30 upon opening. While the neck 134 of standard kingpins has a 36.5 mm height which will permit the full 34 mm range of contact (16 mm thickness plus 18 mm height change) of the controlled jaw 28, placement of the kingpin 32 at different heights relative to the hitch 20 can upset the mating relationship in height between the jaws 28, 30 and the kingpin 32. For instance, one common application is to insert a lube plate 136 around the kingpin 32 so the lube plate 136 rides on the skid plate 24, reducing or minimizing the need to grease the skid plate 24. The lube plate 136 may be formed of a strong bearing material, at a thickness of no more than 3/16 of an inch. The additional height of the lube plate 136 raises the kingpin 32 relative to the jaws 28, 30.

To account for the potential variance in height of the kingpin 32 relative to the jaws 28, 30, the jaws 28, 30 have kingpin receiving recesses 138, 140 defined therein. On the bottom side of the fixed height jaw 30 and the bottom side of the controlled jaw 28, a kingpin receiving recess 138 is defined, shaped to mate with the kingpin 32 upon entry and removal of the kingpin 32 from the hitch 20. The preferred bottom side kingpin receiving recesses 138 are 2 mm deep. On the top side of the controlled jaw 28, a topside kingpin receiving recess 140 is defined, shaped to mate with the kingpin 32 upon entry and remove of the kingpin 32 from the hitch 20. The preferred top side kingpin receiving recess 140 is about 5 mm deep. With the bottom side and top side receiving recesses 138, 140, the contact area of the controlled jaw 28 on the kingpin 32 has a contact height h on the kingpin 32 which is no greater than 10 mm, such as about 8.75 mm. Even when this controlled jaw 28 is raised 18 mm (to the height shown by dashed lines 28a) to clear the height of the fixed height jaw 30, the full range of contact of the controlled jaw 28 on the kingpin 32 is 28 mm or less, allowing use of a lube plate 136 of up to about 3/16 inch (4.5 mm). By having the narrow contact height, the kingpin 32 can be secured within the jaws 28, 30 at different heights relative to the hitch 20 depending upon whether a lube plate 136 is or is not present In considering the operation of the preferred embodiment, the numerous advantages of the present invention become apparent. One significant advantage is that the invention in one aspect permits single-handed manipulation of a single control (handle 38) to provide both the safety function and the hitch movement function. The handle 38 is moved through a first range of travel throughout which it positively secures the controlled jaw 28 at the closed position. Until the handle 38 is pulled a sufficient distance that the control bar 78 no longer overlies and contacts the top side of the controlled jaw 28, there is no possibility of the controlled jaw 28 moving upward and no possibility of inadvertent release of the hitch 20. The same handle 38 is then moved through a second range of travel throughout which it lifts the controlled jaw 28 to the release position. The operator can readily open the hitch 20 using a single hand, by undoing the latch 108 and with a simple movement of the handle 38.

A second advantage involves the fact that opening of the hitch 20 involves translation (pulling and/or pushing) of the handle 38 rather than pivoting or torqueing of the handle 38. Operators are able to impart greater forces in pulling and/or pushing a handle 38 than they can impart in turning or twisting of the handle 38. Even if the operator does not have great hand strength, the forces of the tension spring 100 and the compression spring 94 can be overcome by imparting translational forces on the handle 38.

A related advantage results from the orientation of forces. Operation of the hitch 20 involves raising and lowering the controlled jaw 28. However, it is difficult for many operators to impart a strong raising force without standing over the handle 38 to be raised or straining the operator's back. The preferred embodiment does not require the operator to impart any vertical force, but rather converts the operator's horizontal force on the handle 38 to a vertical force on the controlled jaw 28. The horizontal forces imparted by the operator are in push and pull directions relative to where the operator usually stands beside the hitch 20 during operation of the hitch 20, enabling the operator to readily lean into the direction of push or pull and thereby more easily impart a greater force.

Another force orientation benefit is achieved in the interaction between the spiral lift cam 86 and the controlled jaw 28. Namely, friction between the spiral lift cam 86 and the controlled jaw 28 tends to pivot the controlled jaw 28 in the same direction (clockwise or counterclockwise) that the spiral lift cam 86 pivots. The spiral lift cam 86 and the controlled jaw 28 both open by clockwise motion and both close by counterclockwise motion. By having the spiral lift cam 86 and the controlled jaw 28 moving in the same direction, the frictional forces help to open and close the controlled jaw 28 as desired, which helps minimize the possibility that the controlled jaw 28 might become "out-of-time" with the fixed height jaw 30, i.e., helps avoid the situation wherein one jaw in the open position interlocks with the other jaw in the closed position.

Another related advantage results from the short stroke or throw length of the handle 38 of the present invention in opening the hitch 20. The total release of the hitch 20 is achieved in a handle throw of only about 3 to 6 inches and preferably a complete handle throw of 4 inches or less. The small handle throw necessary to move the hitch 20 from the closed position to the release position is important when one considers the small confines of the bed of the pick-up truck in which the hitch 20 is installed. With a small throw of four inches or less, the hitch 20 can be release by most operators without needing to climb into the bed of the pick-up truck. Even though the handle 38 is pulled outward on the side of the hitch 20, the short throw length enables the hitch 20 to be mounted into beds of all standard sizes, with the kingpin opening 42 centrally mounted relative to the bed, and still provide sufficient clearance between the handle 38 and the box of the pickup truck throughout the handle throw.

The torsion spring 120 in the preferred embodiment provides another advantage. The torsion spring 120 biases the kingpin retention structure provided by the jaws 28, 30 open when the controlled jaw 28 is raised to the release position. Accordingly, in light load or no load situations, the hitch 20 "springs" open once the release position of the handle 38 is reached. It is very clear to the operator when the handle 38 has been pulled far enough to release the hitch 20. After the hitch 20 has "sprung" open, it will not close again until after both the handle 38 is released back to the load position and the spring force of the torsion spring 120 is overcome by moving the kingpin 32 forward in the kingpin receiving slot 26.

Another separate advantage of the preferred embodiment involves the follower/position indicator 124. The operator can readily check to see when the hitch 20 is in the closed, secured position. The position indicator 124 is viewable from the cab of the pick-up truck, so the operator can look over his or her shoulder and check the position indicator as needed, such as immediately after driving over a bump in the road.

Another advantage of the preferred embodiment involves the sleeve arrangement for the control rod 78. The sleeve 80 strengthens the control rod 78 against bending or misalignment. The additional stability and strength that the sleeve 80 provides to the control rod 78 are particularly important in cases when the control rod 78 is inadvertently stepped on or otherwise contacted at an angle to its longitudinal direction of motion.

Although the present invention has been described with reference to preferred embodiments, workers skilled in the art will recognize that changes may be made in form and detail without departing from the spirit and scope of the invention. As just one example, the single handed operation of present invention can be readily applied to a wide variety of hitch structures.

The invention claimed is:

1. A trailer hitch for engaging a kingpin of a trailer, the trailer hitch comprising:
 a support frame attachable in the bed of a truck;
 a kingpin retention structure being securable about the kingpin; and
 an actuation structure for the kingpin retention structure, comprising:
  a bar which is linked to the kingpin retention structure, such that longitudinal translation of the bar moves the kingpin retention structure relative to the kingpin, the bar having at least one latch recess defined therein;
  an opening on the support frame through which the bar translates; and
  a latch which mates into the latch recess on the bar and which attaches relative to the opening on the support frame to prevent the bar from translating;
 wherein the latch recess is positioned on the bar to hold the kingpin retention structure in an open position during release of the kingpin.

2. The trailer hitch of claim 1, wherein the latch recess is positioned on the bar to hold the kingpin retention structure in a closed position during engagement of the kingpin.

3. The trailer hitch of claim 1, wherein a second latch recess is defined in the bar, the second latch recess positioned on the bar to hold the kingpin retention structure in a closed position during engagement of the kingpin.

4. A trailer hitch for engaging a kingpin of a trailer, the trailer hitch comprising:
 a support frame attachable in the bed of a truck;
 a kingpin retention structure being securable about the kingpin; and
 an actuation structure for the kingpin retention structure, comprising:
  a bar which is linked to the kingpin retention structure, such that longitudinal translation of the bar moves the kingpin retention structure relative to the kingpin, the bar having at least one latch recess defined therein;
  an opening on the support frame through which the bar translates; and
  a latch which mates into the latch recess on the bar and which attaches relative to the opening on the support frame to prevent the bar from translating;
 wherein the bar translates in a sleeve, and wherein the latch is hingedly connected to the sleeve.

5. The trailer hitch of claim 1, wherein the bar has a first range of movement in which the bar positively prevents the kingpin retention structure from opening and a second range of movement in which the bar opens the kingpin retention structure.

6. The trailer hitch of claim 5, in which the kingpin retention structure comprises a moveable jaw for engaged contact with the kingpin, wherein the bar is in contact with the moveable jaw during the first range of movement.

7. The trailer hitch of claim 6, in which the second range of movement of the bar raises the moveable jaw, and wherein the bar is in contact with an upper surface of the moveable jaw during the first range of movement.

8. A trailer hitch for engaging a kingpin of a trailer, the trailer hitch comprising:
 a support frame attachable in the bed of a truck;
 a kingpin retention structure being securable about the kingpin, wherein the kingpin retention structure comprises a jaw contacting the kingpin in the closed position; and
 an actuation structure for the kingpin retention structure, comprising:
  a bar which is linked to the kingpin retention structure, such that longitudinal translation of the bar moves the kingpin retention structure relative to the kingpin, the bar having at least one latch recess defined therein, wherein the releasing throw of the bar operates through a linkage to open the jaw, with frictional interaction between the linkage and the jaw during the releasing throw tending to bias the jaw toward the open position;
  an opening on the support frame through which the bar translates; and
  a latch which mates into the latch recess on the bar and which attaches relative to the opening on the support frame to prevent the bar from translating.

9. A trailer hitch for engaging a kingpin of a trailer, the trailer hitch comprising:
 a support frame attachable in the bed of a truck;
 a kingpin retention structure being securable about the kingpin; and
 an actuation structure for the kingpin retention structure, comprising:
  a bar which is linked to the kingpin retention structure, such that longitudinal translation of the bar moves the kingpin retention structure relative to the kingpin, the bar having at least one latch recess defined therein;
  an opening on the support frame through which the bar translates; and
  a latch which mates into the latch recess on the bar and which attaches relative to the opening on the support frame to prevent the bar from translating;
 wherein the support frame comprises a bearing which permits movement of the engaged kingpin relative to the bed of the truck into which the hitch is attached, and wherein the bar is supported by the bearing with the kingpin and the kingpin retention structure so the bar moves with the kingpin and the kingpin retention structure.

10. A trailer hitch for engaging a kingpin of a trailer, the trailer hitch comprising:
 a support frame;

a kingpin retention structure supported by the support frame, the kingpin retention structure comprising a first jaw which is securable in a secured position in contact about the kingpin, wherein the first jaw comprises a recess which reduces the contact area of the jaw on the kingpin relative to a thickness of the jaw, such that the recess reduces the contact area to a contact height on the kingpin which is no greater than 10 mm, so the kingpin can be secured within the kingpin retention structure at different heights relative to the kingpin retention structure depending upon whether a lube plate is or is not present.

11. The trailer hitch of claim 10, wherein the first jaw moves vertically to release the kingpin, wherein the height of vertical movement of the first jaw during release is greater than the contact height of the jaw on the kingpin.

12. The trailer hitch of claim 11, wherein the kingpin retention structure comprises a second jaw which is securable in a secured position in contact about the kingpin in a mating relationship with the first jaw, and wherein the height of vertical movement of the first jaw during release is at least as high as a thickness of the second jaw.

13. A trailer hitch for engaging a kingpin of a trailer, the trailer hitch comprising:

a support frame attachable in the bed of a truck;

a kingpin retention structure being securable about the kingpin; and a bearing structure supporting the kingpin retention structure from the support frame, the bearing structure permitting both limited fore and aft movement of the kingpin retention structure relative to the support frame and limited side to side movement of the kingpin retention structure relative to the support frame, wherein the stiffness of the bearing structure for fore and aft movement is different than the stiffness of the bearing structure for side to side movement.

14. The trailer hitch of claim 13, wherein the bearing structure is biased toward an aligned position with one or more elastomeric pads.

15. The trailer hitch of claim 13, wherein the bearing structure is a spherical bearing which is stiffer in roll than in pitch.

16. The trailer hitch of claim 15, wherein the bearing structure is biased toward an aligned position with a first elastomeric pad which permits essentially free movement of the bearing structure in pitch and which compresses during roll.

17. The trailer hitch of claim 16, wherein the bearing structure is biased toward an aligned position with a second elastomeric pad which compresses during pitch and during roll.

* * * * *